May 1, 1934.                M. R. WOLFARD                1,956,606
            INLET MANIFOLD FOR INTERNAL COMBUSTION ENGINES
                    Filed Aug. 25, 1930        2 Sheets-Sheet 1
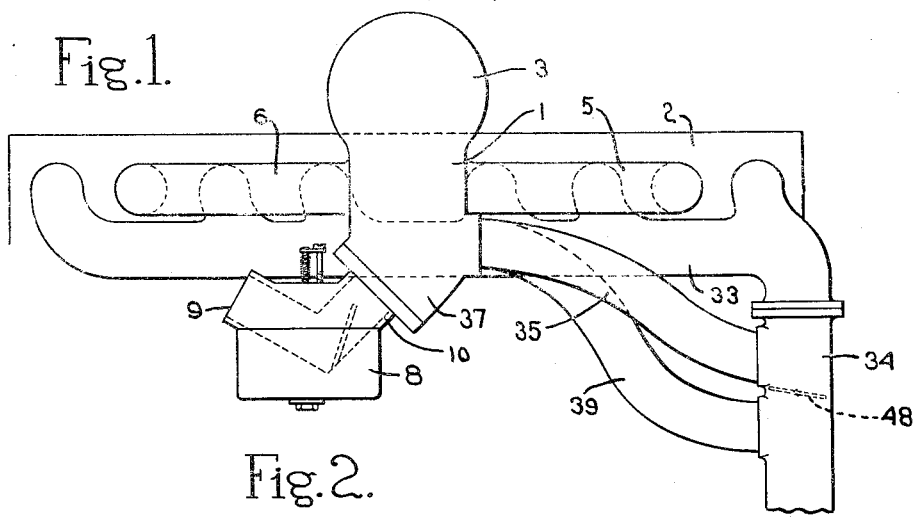
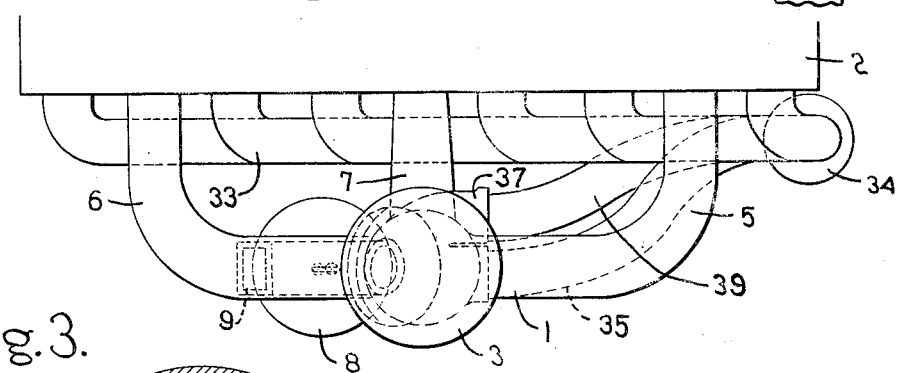
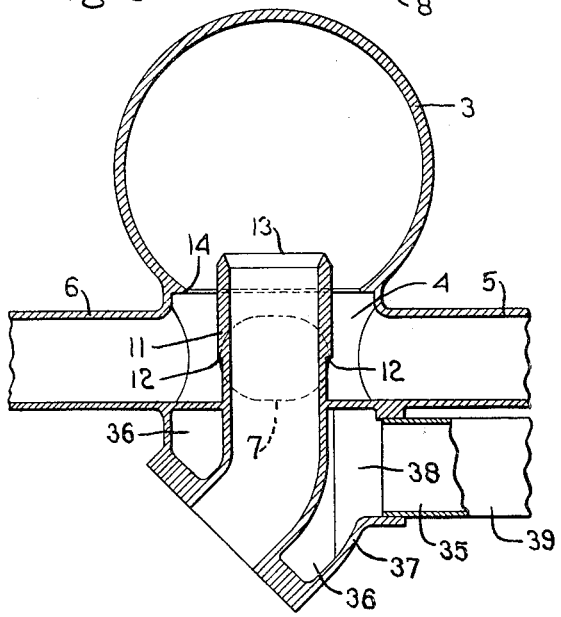
Inventor.
Merl R. Wolfard
by Heard Smith & Tennant.
Attys.

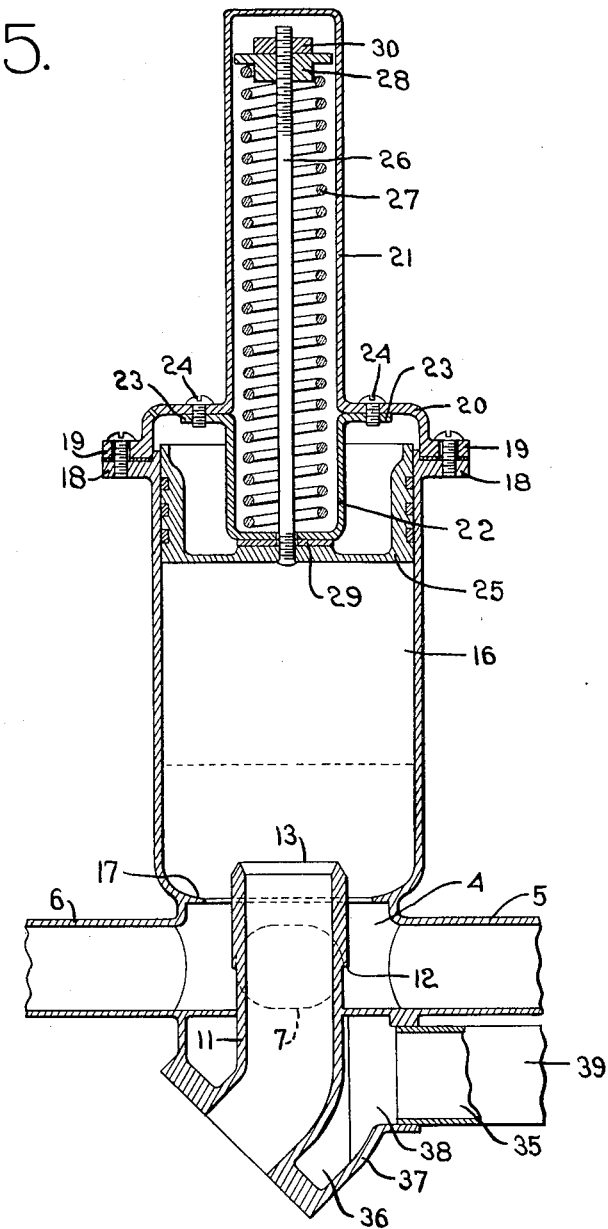

Patented May 1, 1934

1,956,606

UNITED STATES PATENT OFFICE 1,956,606

INLET MANIFOLD FOR INTERNAL COMBUSTION ENGINES

Merl R. Wolfard, Cambridge, Mass., assignor to Hopewell Brothers, Watertown, Mass., a copartnership composed of Charles F. Hopewell and Helen C. Hopewell Application August 25, 1930, Serial No. 477,500

18 Claims. (Cl. 123—52)

This invention relates to improvements in inlet manifolds for multi-cylinder internal combustion engines, and the general object of the invention is to provide a manifold construction for conducting the fuel-air mixture to the cylinders of the engine in such manner that unvaporized fuel entrained in the air will be carried in equal proportions to all of the cylinders of the engine irrespective of the speed or torque at which the engine is operated.

In multi-cylinder internal combustion engines the fuel-air mixture is supplied to a distributing section of the manifold and conducted therefrom through conduits to the several cylinders of the engine.

In ordinary practice, the firing sequence of the cylinders requires that cylinders remote from each other be successively supplied with the fuel-air mixture from the distributing section of the manifold, thus causing a change in the direction or a reversal in the direction of flow of the fuel-air mixture in said distributing section. Furthermore, the velocity of flow in any conduit leading to a cylinder during the charging period of said cylinder increases up to a maximum, then decreases, and finally is stopped altogether by the closing of the inlet valve.

At high speeds of the engine, this sudden stoppage of flow in the manifold conduit leading to the charging cylinder will cause a rebound or a surge-wave to travel back to the distributing section. The disturbing influence of this surge-wave on the uniformity of flow of the fuel-air mixture increases with increase in density of the mixture in the manifold.

The changes in the direction of flow, the changes in velocity of flow, and the surge-wave thus produced operate severally, and especially cumulatively, to throw any sizable particles of liquid fuel entrained in the air of the mixture toward a particular wall of, or toward the entrance to a conduit leading from, the distributing section, thus enriching the mixture supplied to one of the cylinders while leaning down the mixture supplied to another cylinder.

These surge-waves, in conjunction with changes in the velocity of flow, cause the rate of flow through the carburetor to change in such manner as to make difficult precise metering of the fuel in proper proportion to the air flowing through the carburetor. This is particularly true when the engine is operated through a wide range in speed and power.

The object of the invention is to provide means to substantially eliminate these defects at the region of distribution in the manifold in such a manner as to insure the carrying of the unvaporized fuel entrained in the air substantially in equal proportions to all of the cylinders of the engine at whatever speed or torque the engine may be operated. This is accomplished by providing a mixture-receiving chamber having an upper energy-dissipating portion or section and a lower distributing section with conduits leading from the latter to the several cylinders of the engine.

The term "energy-dissipating section" or "dissipating section" is used herein to define the portion of the surge-absorbing chamber, the function of which is to dissipate the energy of the stream of fuel-air mixture supplied thereto, and also to dissipate the energy of surge and eddy currents caused by changes in the direction of flow or in the velocity of flow within the distributing section.

A further object of the invention is to provide means for introducing the fuel-air mixture into the mixture-receiving chamber in a direction and at such velocity as to prevent unequal concentration of the fuel particles within the mixture in any localized section of the said chamber.

A further object of the invention is to provide means for selectively varying the volume of the mixture-receiving chamber in such manner as to most effectively adapt the size and proportions of the said chamber to a selected or limited range of conditions under which the engine may be operating. One method of accomplishing this is to provide means for varying the volume of the surge-absorbing chamber in response to the differential of pressure existing between the absolute pressure of the atmosphere and the absolute pressure of the fuel-air mixture in the manifold, as the suction head in the manifold varies.

Another object of the invention is to improve the uniformity of mixture delivered by the carburetor to the manifold, by minimizing the fluctuations in the flow of air through the carburetor.

These and other objects and features of the invention will more fully appear from the following description and the accompanying drawings and will be particularly pointed out in the claims.

Preferred embodiments of the invention are illustrated in the accompanying drawings, in which:

Figure 1 is a side elevation of an intake manifold embodying the invention applied to cylinders of an engine and also showing a carburetor for supplying the fuel-air mixture to the manifold and an exhaust manifold having a branch adapted to supply heat to a portion of the inlet manifold;

Fig. 2 is a plan view of the same;

Fig. 3 is a detail view in vertical longitudinal section of the central portion of the form of manifold construction illustrated in Fig. 1; and Fig. 4 is a similar view of a modified inlet manifold construction embodying the invention.

Fig. 5 is a view in vertical section of a modified form of the invention comprising means for varying the volume of the surge-absorbing chamber in response to the differential of pressure existing between the absolute pressure of the atmosphere and the absolute pressure of the fuel-air mixture in the manifold as the suction head in the manifold varies.

The manifold 1 embodying the present invention is illustrated in Figs. 1 and 2 as applied to the cylinder block 2 of a six-cylinder internal combustion engine and comprises a central mixture-receiving chamber having an upper, preferably spheroidal, energy-dissipating section 3 and a lower, preferably substantially cylindrical, distributing section 4. Conduits 5 and 6 lead from the distributing section 4 to pairs of cylinders at either end of the engine block, while a conduit 7 leads from the distributing chamber 4 to the central pair of cylinders. Means are provided for introducing fuel-air mixture into the mixture-receiving chamber in such manner as to prevent unequal concentration of the fuel particles within the mixture in any localized section of the chamber. In the preferred construction illustrated, this is accomplished by providing a carbureter 8, preferably of the type disclosed in my prior Patent No. 1,823,019, granted September 15, 1931, and application, Serial No. 414,300, filed December 16, 1929, having an air inlet 9 and an outlet 10 for the mixture communicating with the lower end of a delivery tube 11, the upper end of which extends into the distributing section 4 to such distance as to deliver the fuel-air mixture into the mixture-receiving chamber in such manner as to prevent unequal concentration of the fuel particles within the mixture in any localized section of said chamber.

Preferably the volume of the mixture-receiving chamber is greater than that of a sphere whose diameter is twice the diameter of the carbureter outlet, and less than that of a sphere whose diameter is four times the diameter of the carbureter outlet. Inasmuch as the carbureter outlet is substantially standardized for automobile engines, the size of the mixture-receiving chamber can be easily determined for any practical installation.

As illustrated in Fig. 3, the delivery tube 11 extends upwardly through the distributing section 4 and into the spheroidal portion 3 of the mixture-receiving chamber and desirably terminates at a distance below the center of the spheroidal portion 3 approximately equal to one-fourth of the diameter of said spheroidal portion.

The delivery tube 11 is provided with an externally-thickened wall presenting an annular shoulder providing a sharp angle 12 located approximately at the horizontal plane of the axes of the conduits 5, 6 and 7 leading to the cylinders of the engine. The discharge end of the delivery tube desirably is beveled to present a sharp edge 13 preferably having its inside wall flared at an angle of approximately 20° to intersect a conical termination of its outer wall at an angle of about 50°. The wall of the spheroidal portion 3 of the mixture-receiving chamber desirably extends inwardly at its junction with the wall of the distributing section to present an inwardly-extending web 14 restricting the area of communication between the spheroidal portion of the mixture-receiving chamber and the distributing section thereof to an area preferably approximating two and one-half times the mean cross-sectional area of said delivery tube. The mean cross-sectional area of the delivery tube is specified as it has been found in practice that a delivery tube having the form of a venturi, with the large end communicating with the surge-absorbing chamber gives satisfactory results when the mean cross-sectional area of the portion of the delivery tube which extends above the floor of the distributing section is substantially the same as that of a delivery tube of uniform cross-section.

In the operation of the device, a properly-proportioned fuel-air mixture is supplied from a carbureter or other fuel-and-air mixing device to the delivery tube 11, and flows upwardly therethrough into the central portion of the spheroidal portion 3 of the mixture-receiving chamber in response to the suction from the several cylinders of the engine during the intake strokes of the piston thereof. The delivery tube is so located with respect to the shape and size of the spheroidal portion of the mixture-receiving chamber as will prevent unequal concentration of the fuel particles within the mixture in any localized section or sections of the mixture-receiving chamber. The fuel-air mixture flows downwardly through the restricted opening in the lower end of the spheroidal portion 3 of the mixture-receiving chamber into the distributing section 4 thereof, and thence, selectively, through any one of the conduits 5, 6 or 7 leading to the particular cylinder or cylinders of the engine operating upon a suction stroke.

The sequence in charging cylinders remote from each other causes changes in the direction and reversals of flow of the mixture in the distributing section. Furthermore, the velocity of flow toward a charging cylinder increases up to a maximum, then decreases, and finally is stopped altogether by the closing of the inlet valve, thereby causing a rebound or surge-wave to travel back to the distributing section, such action being most pronounced with denser mixtures and at the higher speeds of the engine.

In the construction illustrated in Figs. 1, 2 and 3 the surges and eddy currents caused by these changes in velocity and direction of flow in-so-far as they cause disturbances in the distributing section, are effectively absorbed in the mixture-receiving chamber, thus preventing throwing out of any sizable particles of the liquid fuel entrained in the air of the mixture toward any particular section of the wall of the chamber or toward the entrance of any conduit leading from the distributing section.

The surge-absorbing action of the mixture-receiving chamber also reduces the pulsations in the flow of air through the carbureter, and thereby improves the uniformity of mixture-proportioning in the carbureter.

Desirably, the area of communication between the distributing section 4 and the larger spheroidal energy-dissipating section 3 is restricted. This is particularly desirable if the volume of the spheroidal portion is increased relatively to the volume of the distributing section.

The best results have been obtained in practice when this restriction has a cross-sectional area not less than twice nor more than three times the cross-sectional area of the delivery tube. The lower limit of cross-sectional area should be such as not to create a velocity of flow of the fuel-air mixture which will tend to throw out particles of liquid fuel against the floor of the distributing chamber. Presumably the larger limit of cross-sectional area should be such as to avoid the tendency of the surges in the distributing section to be transmitted bodily into the larger spheroidal portion. By reason of this construction, therefore, a properly-proportioned mixture will be conducted in uniform quality to each and every cylinder of the engine at whatever torque or speed the engine is operated.

In Fig. 4 a modified form of the invention is illustrated in which the mixture-receiving chamber comprises a distributing section 4 and conduits 5, 6 and 7 leading therefrom to the cylinders of the engine, but in which the upper and larger energy dissipating section of the mixture-receiving chamber is in the form of a cylinder 15 which communicates at its lower end with the distributing section.

In this construction, the delivery tube 11 projects above the floor of the distributing section, and discharges the fuel-air mixture upwardly through said distributing section into the larger energy-dissipating section 15.

Under certain conditions it may be desirable to vary the size or volume of the mixture-receiving chamber for the purpose of so co-ordinating the size of the mixture-receiving chamber with its proportional dimensions as most effectively to absorb the surges and eddy currents produced at the distributing section by changes in the velocity or in the direction of the mixture flow within different parts of the manifold. This may be accomplished by providing the upper portion of the mixture-receiving chamber with an adjustable piston or diaphragm, the position of which may be varied to provide the most desirable volume for a predetermined operating condition. Manually-operable adjustment for the piston or diaphragm may be employed, but preferably means are provided which permit automatic adjustment of the position of the piston or diaphragm in response to the differential of pressure existing between the absolute pressure of the atmosphere and the absolute pressure of the fuel-air mixture in the manifold, as the suction head in the manifold varies. In Fig. 5 a preferred construction is illustrated for accomplishing this purpose.

In this construction a distributing chamber 4 and the conduits leading therefrom to the several cylinders of the engine may be, and desirably are, the same as those disclosed in Figs. 1 to 4, inclusive. The upper portion of the distributing chamber is in the form of a cylinder 16, the wall of which preferably is integral with the wall of the manifold. A delivery tube 11 for the fuel-air mixture extends centrally through the distributing section 4 in the lower end of the cylindrical upper portion of the mixture-receiving chamber, the wall of which slopes inwardly toward the junction of the cylinder with the wall of the distributing section to provide a restricted area 17 between the upper portion of the mixture-receiving chamber and the lower distributing section thereof.

The upper end of the cylinder is provided with a peripheral flange 18 to which is secured the base flange 19 of a hollow cap 20 having a cylindrical extension 21 of relatively small diameter in axial alignment with the cylinder 16. A cylindrical member 22 of the same diameter as the cylindrical extension of the cap, and having a peripheral flange 23 secured to the cap 20 by cap-screws 24, extends downwardly in axial alignment with the cap extension 21 and forms a support for a positioning spring.

A piston 25 is reciprocably mounted in the cylinder 16 and is provided with suitable piston rings to prevent leakage between the piston and the cylinder wall.

A rod 26, which is secured to the center of the piston, in any suitable manner, as by a screw-threaded connection and an upset lower end, extends from the piston axially of the cylindrical extension 21 of the cap and has a screw-threaded upper end provided with a nut 28, preferably having a peripheral flange which rests upon the upper end of a spiral spring 27, the lower end of which rests upon the end of the cylindrical member 22. The lower end of the cylindrical member also serves as a stop to limit the upward movement of the piston. A fibre washer 29, in contact with the upper face of the piston, prevents metal-to-metal contact of the piston with the spring-supporting member 22.

When the piston is in its uppermost position, as illustrated in Fig. 5, the spring 27 may be given any desired degree of compression by adjustment of the nut 28, and the latter may then be secured in the adjusted position by a lock-nut 30.

By reason of this construction the spring 27 will hold the piston in its uppermost position when the chamber of the cylinder is at atmospheric pressure. When, however, the chamber of the cylinder is subjected to the suction of the engine, a partial vacuum will be created which will cause the piston to move downwardly, thereby varying the size of the mixture-receiving chamber, in coordination with its proportional dimensions, in such manner as most efficiently to absorb the surge and eddy currents produced by changes in velocity and in direction of mixture flow within the distributing section of the mixture-receiving chamber and the adjacent portions of the conduits leading therefrom to the cylinders of the engine, so that a properly-proportioned mixture will be conducted in uniform quality to each and every cylinder of the engine at whatever torque or speed the engine is operating.

Abrupt movements of the piston may be restrained by a dash-pot action between the piston and the cap 20. This is accomplished, in the structure shown in Fig. 5, by placing a gasket between the flange 18 of the cylinder and the flange 19 of the cap and properly securing these flanges together so as to form an air-tight connection and by providing a small port in the cap 20 which is sufficiently small to give the desired retardation in flow of air into or out of the chamber between the piston and the cap 20. A suitable lubricant, such as castor oil, which is not readily washed away by gasolene, may be introduced into the chamber above the piston to lubricate the contacting walls of the cylinder and piston.

The invention further comprises means, selectively operable, to conduct the hot products of combustion around the lower portion of the delivery tube and beneath the floor of the distributing section. In this construction the usual exhaust manifold 33 communicates with the exhaust conduit 34 having a branch 35 leading to a chamber 36 in a casing 37 enclosing a portion of the delivery tube below the floor of the distributing section. The casing 37 is provided with a partition wall 38 extending in proximity to the delivery tube, but not in contact therewith, which serves to direct most of the products of combustion around the delivery tube to a return conduit 39 which communicates with the exhaust conduit 34 below the branch 35. The partition wall 38, by terminating short of the delivery tube, permits a portion of the hot products of combustion to impinge directly upon the delivery tube, and then to flow toward the entrance of the return conduit 39.

The exhaust conduit 34 is provided with a manually-operable butterfly valve 48 located between the branch 35 and the return conduit 39 and is operable to by-pass more or less of the hot products of combustion through the branch 35, thereby supplying such heat to the delivery tube and to the floor of the distributing section as may be desirable to insure the maintenance of the mixture at a proper temperature to produce maximum economy.

While the inlet manifold embodying the present invention is so effective in the distribution of a uniform quality of mixture to the several cylinders of the engine as to produce maximum power even though the temperatures are low, it is a well-established fact that with commercial grades of gasoline some heat should be supplied to the mixture, particularly in cold weather, in order to obtain maximum economy. This selectively-operable heating mechanism is therefore particularly valuable during the warming-up period of the engine, and also when the engine is subjected to unusually low temperatures.

It will be understood that the particular embodiments of the invention disclosed herein are of an illustrative character and not restrictive of the scope and meaning of the following claims.

Having thus described the invention, what is claimed as new, and desired to be secured by Letters Patent, is:

1. An inlet manifold for a multi-cylinder internal combustion engine comprising a mixture-receiving chamber having an upper energy-dissipating section and a lower distributing section, conduits leading from said distributing section to the cylinders of the engine, and means for introducing a fuel-air mixture into said mixture-receiving chamber in such manner as to prevent unequal concentration of the fuel particles within the mixture in any localized section of said chamber, said distributing section of said chamber being smaller in volume than the energy-dissipating section of said chamber.

2. An inlet manifold for a multi-cylinder internal combustion engine comprising a mixture-receiving chamber having an upper energy-dissipating section and a lower distributing section, conduits leading from said distributing section to the cylinders of the engine, and means for introducing a fuel-air mixture into said mixture-receiving chamber in such manner as to prevent unequal concentration of the fuel particles within the mixture in any localized section of said chamber, said distributing section of said chamber being smaller in volume than the energy-dissipating section of said chamber and also smaller in cross-sectional area than that of the central part of said energy-dissipating section.

3. In combination with a multi-cylinder internal combustion engine, an inlet manifold comprising a mixture-receiving chamber having an upper energy-dissipating section and a lower distributing section, conduits leading therefrom to the cylinders of the engine, a carbureter for supplying a properly-proportioned fuel-air mixture having an outlet communicating with a delivery tube projecting into said distributing section and discharging the fuel-air mixture upwardly through said distributing section in such manner as to prevent unequal concentration of the fuel particles in the mixture in any localized section of the chamber, the size of said chamber in coordination with its proportional dimensions being such that unvaporized fuel entrained in the air will be carried therefrom in substantially equal proportions to all the cylinders of the engine at whatever speed or torque the engine is operated.

4. In combination with a multi-cylinder internal combustion engine, an inlet manifold comprising a mixture-receiving chamber having an upper energy-dissipating section and a lower distributing section, conduits leading therefrom to the cylinders of the engine, a carbureter for supplying a properly-proportioned fuel-air mixture having an outlet communicating with a delivery tube projecting into said distributing section and discharging the fuel-air mixture into said mixture-receiving chamber in such manner as to prevent unequal concentration of the fuel particles within said mixture in any localized section of said chamber, said chamber having a volume greater than that of a sphere whose diameter is twice the diameter of said carbureter outlet and less than the volume of a sphere whose diameter is four times that of the carbureter outlet.

5. An inlet manifold for a multi-cylinder internal combustion engine comprising a mixture-receiving chamber having an upper energy-dissipating section and a lower distributing section of smaller volume than said upper section, conduits leading from said distributing section to the cylinders of the engine, and means for supplying a properly-proportioned fuel-air mixture including a delivery tube arranged to discharge the mixture upwardly through said distributing section into said energy-dissipating section of the mixture-receiving chamber.

6. An inlet manifold for a multi-cylinder internal combustion engine comprising a mixture-receiving chamber having an upper energy-dissipating section and a lower distributing section of smaller volume than said upper section, conduits leading from said distributing section to the cylinders of the engine, and means for supplying a properly-proportioned fuel-air mixture including a delivery tube extending upwardly through said distributing section and discharging the fuel-air mixture into the energy-dissipating section, said chamber having a section of restricted area below the discharge end of said delivery tube and between said energy-dissipating section and said distributing section.

7. An inlet manifold for a multi-cylinder internal combustion engine comprising a mixture-receiving chamber having an upper energy-dissipating section and a lower distributing section of smaller volume than said upper section, conduits leading from said distributing section to the cylinders of the engine, and means for supplying a properly-proportioned fuel-air mixture including a delivery tube extending upwardly through said distributing section and discharging the fuel-air mixture into the energy-dissipating section, said chamber having a section of restricted area, below the discharge end of said delivery tube located between said energy-dissipating section and said distributing section, of more than twice and less than three times the mean cross-sectional area of said delivery tube.

8. An inlet manifold for a multi-cylinder internal combustion engine comprising a mixture-receiving chamber having an upper portion of spheroidal contour and a lower distributing section of smaller volume than that of said spheroidal portion, conduits leading from the distributing section to the cylinders of the engine, and means for introducing a fuel-air mixture into the mixture-receiving chamber in such manner as to prevent unequal concentration of the fuel particles within said mixture in any localized section of said chamber.

9. An inlet manifold for a multi-cylinder internal combustion engine comprising a mixture-receiving chamber having an upper portion of spheroidal contour, a lower distributing section, conduits leading from the said distributing section to the cylinders of the engine, means for supplying a properly-proportioned fuel-air mixture including a delivery tube extending upwardly through said distributing section into the spheroidal portion of said chamber to a height approximating one-quarter of the diameter of said spheroidal portion below the center of said spheroidal portion.

10. An inlet manifold for a multi-cylinder internal combustion engine comprising a mixture-receiving chamber having an upper portion of spheroidal contour, a lower distributing section of cylindrical contour, conduits leading from the said distributing section to the cylinders of the engine, means for supplying a properly-proportioned fuel-air mixture including a delivery tube extending upwardly through said distributing section into the spheroidal portion of said chamber to a height approximating one-quarter of the diameter of said spheroidal portion below the center of said spheroidal portion, and means intermediate of the upper portion and distributing section restricting the area of communication therebetween to approximately two and one-half times the mean cross-sectional area of said delivery tube.

11. An inlet manifold for a multi-cylinder internal combustion engine comprising a mixture-receiving chamber having an upper energy-dissipating section and a lower distributing section of smaller volume than said upper section, conduits leading from said distributing section to the cylinders of the engine, and means for supplying a properly-proportioned fuel-air mixture including a delivery tube extending upwardly through said distributing section and discharging the fuel-air mixture into said energy-dissipating section and having its inside wall at the discharge end flared at an angle of about 20° to intersect a conical termination of its outside wall at an angle of about 50°.

12. An inlet manifold for a multi-cylinder internal combustion engine comprising a mixture-receiving chamber having an upper energy-dissipating section and a lower distributing section of smaller volume than said upper section, conduits leading from said distributing section to the cylinders of the engine, and means for supplying a properly-proportioned fuel-air mixture including a delivery tube extending upwardly through said distributing section and discharging the fuel-air mixture into said energy-dissipating section and having approximately midway of the height of said distributing section an annular shoulder adapted to permit particles of liquid fuel which may flow downwardly along the external wall of said tube to be picked up by the cross-currents of air flowing around said tube.

13. An inlet manifold for a multi-cylinder internal combustion engine comprising a mixture-receiving chamber having an upper energy-dissipating section and a lower distributing section of smaller volume than said energy-dissipating section, conduits leading from said distributing section to the cylinders of the engine, means for introducing a fuel-air mixture into said mixture-receiving chamber in such manner as to prevent unequal concentration of the fuel particles in any localized section of the chamber, and means for varying the volume of said energy-dissipating section.

14. An inlet manifold for a multi-cylinder internal combustion engine comprising a mixture-receiving chamber having an upper energy-dissipating section and a lower distributing section of smaller volume than said energy-dissipating section, conduits leading from said distributing section to the cylinders of the engine, means for introducing a fuel-air mixture into said mixture-receiving chamber in such manner as to prevent unequal concentration of the fuel particles in any localized section of the chamber, and means automatically operable by the differential of pressure existing between the absolute pressure of the atmosphere and the absolute pressure of the fuel-air mixture in the manifold, as the suction head in the manifold increases, to decrease the volume of said energy-dissipating section.

15. An inlet manifold for a multi-cylinder internal combustion engine comprising a mixture-receiving chamber having an upper cylindrical portion and a lower distributing section of smaller volume than said upper cylindrical portion, conduits leading from said distributing section to the cylinders of the engine, a piston in said cylindrical portion, means for supplying a properly-proportioned fuel-air mixture including a delivery tube extending upwardly through said distributing section and discharging the fuel-air mixture axially into said upper portion of the mixture-receiving chamber, and means for positioning the piston to vary the volume of the upper cylindrical portion of the mixture-receiving chamber.

16. An inlet manifold for a multi-cylinder internal combustion engine comprising a mixture-receiving chamber having an upper cylindrical portion and a lower distributing section of smaller volume than said upper cylindrical portion, conduits leading from said distributing section to the cylinders of the engine, a piston in said cylindrical portion, means for introducing a fuel-air mixture into the said mixture-receiving chamber in such manner as to prevent unequal concentration of the fuel particles in any localized section of said chamber, and means, including a spring, operable to raise said piston to a predetermined upper limit of movement when the fuel-air mixture within the manifold is at atmospheric pressure but yieldable in response to the differential of pressure between the absolute pressure of the atmosphere and the absolute pressure of the fuel-air mixture in the manifold, produced by variations in suction head in the manifold, to decrease the volume of the upper cylindrical portion of the mixture-receiving chamber.

17. An inlet manifold for a multi-cylinder internal combustion engine comprising a mixture-receiving chamber having an upper cylindrical portion and a lower distributing section of smaller volume than said upper cylindrical portion, conduits leading from said distributing section to the cylinders of the engine, a piston into said cylindrical portion, means for introducing a fuel-air mixture in the said mixture-receiving chamber in such manner as to prevent unequal concentration of the fuel particles in any localized section of said chamber, means, including a spring, operable to raise said piston to a predetermined upper limit of movement when the fuel-air mixture within the manifold is at atmospheric pressure but yieldable in response to the differential of pressure between the absolute pressure of the atmosphere and the absolute pressure of the fuel-air mixture in the manifold, produced by variations in suction head in the manifold, to reduce the volume of the upper cylindrical portion of the mixture-receiving chamber, and means for adjusting the initial tension upon said spring to insure proper positioning of the piston in correlation to changes in atmospheric pressure or other predeterminable operating conditions.

18. An inlet manifold for a multi-cylinder internal combustion engine comprising a mixture-receiving chamber having an upper cylindrical portion and a lower distributing section of smaller volume than said upper cylindrical portion, conduits leading from said distributing section to the cylinders of the engine, a piston in said cylindrical portion, means for introducing a fuel-air mixture into the said mixture-receiving chamber in such manner as to prevent unequal concentration of the fuel particles in any localized section of said chamber, means, including a spring, operable to raise the piston to a predetermined upper limit of movement but yieldable in response to variations of the suction head in the manifold to vary the volume of the upper portion of said mixture-receiving chamber, an air-tight cap enclosing the upper end of the cylinder having a small port operable so to restrict the passage of air therethrough into and out of the chamber between the piston and cap as to restrain abrupt movements of the piston.

MERL R. WOLFARD.